United States Patent [19]

Bikle et al.

[11] 4,212,199
[45] Jul. 15, 1980

[54] SYSTEM FOR USE IN CONDUCTING WAKE INVESTIGATION FOR A WING IN FLIGHT

[75] Inventors: Paul F. Bikle; Lawrence C. Montoya, both of Lancaster, Calif.

[73] Assignee: The United States of America as represented by the Administrator of the National Aeronautics and Space Administration, Washington, D.C.

[21] Appl. No.: 15,983

[22] Filed: Feb. 28, 1979

[51] Int. Cl.³ .............................................. G01C 21/00
[52] U.S. Cl. ................................. 73/861.66; 73/180; 73/182; 73/861.65
[58] Field of Search ............. 73/180, 182, 183, 178 R, 73/212, 147

[56] References Cited

U.S. PATENT DOCUMENTS

| | | | |
|---|---|---|---|
| 3,273,399 | 9/1966 | Saltzman et al. | 73/212 |
| 3,699,811 | 10/1972 | Maiden et al. | 73/147 |

OTHER PUBLICATIONS

"Reports and Memorandums", No. 1688, British A.R.C., Jan. 1963.
"Use of a Pitot-static Probe for Determining Wing Section Drag In Flight at Mach Numbers From 0.5 to Approximately 1.0 NASA TMX-56025," Jul. 1974, Montoya et al.

Primary Examiner—Donald O. Woodiel
Attorney, Agent, or Firm—Monte F. Mott; John R. Manning; Paul F. McCaul

[57] ABSTRACT

A system supported by a wing in flight having a reference total pressure port in spaced relation with a wake as the wake is generated by the wing, a reference static pressure port supported in spaced relation with the wake, a probe adapted to be displaced along an arcuate path through the wake including a total pressure port and static pressure ports. A differential pressure transducer and a pressure switching device interposed between the ports and the transducer is provided for selectively connecting pairs of the ports to the transducer in opposed relation, whereby a single transducer is utilized in obtaining differential pressure measurement for the wake with enhanced accuracy.

7 Claims, 6 Drawing Figures

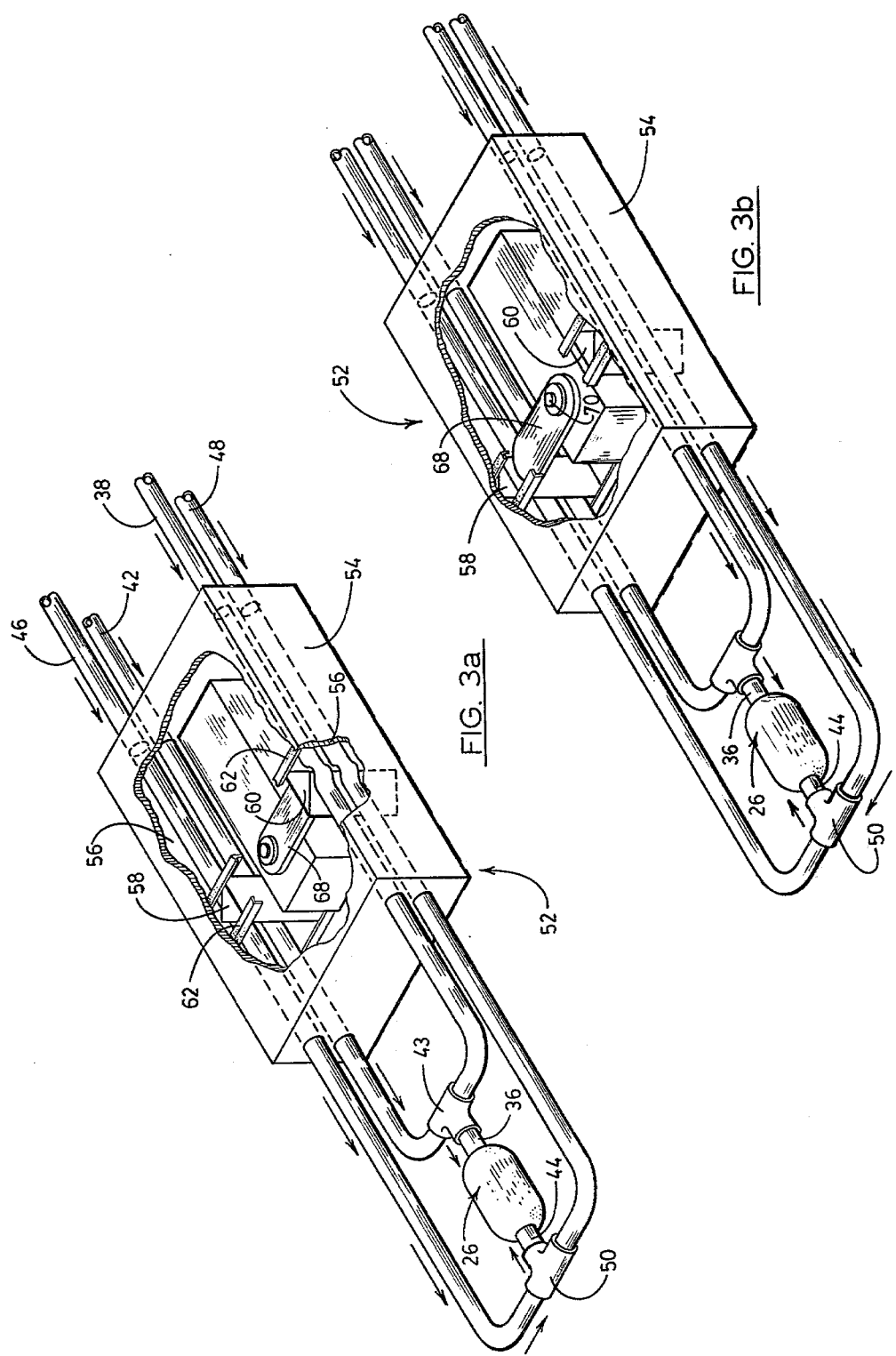

SYSTEM FOR USE IN CONDUCTING WAKE INVESTIGATION FOR A WING IN FLIGHT

ORIGIN OF THE INVENTION

The invention described herein was made by an employee of the U.S. Government and may be manufactured and used by or for the Government for governmental purposes without the payment of any royalties thereon or therefor.

BACKGROUND OF THE INVENTION

1. Field of the Invention

The invention generally relates to systems adapted for use in conducting in-flight wing wake section drag investigation employing traversing pitot and static probes, and more particularly to an improved system for use conducting wake investigations employing a single transducer and a pressure switching device for alternatively connecting pairs of pressure heads to the transducer in opposing relationships whereby measurements of pressure differentials for a wake are directly obtainable.

2. Description of the Prior Art

The prior art, of course, is replete with pressure sensing devices, such as pitot tubes and the like, employed in obtaining absolute pressure measurements for bodies in flight. Moreover, pitot-traverse techniques for detecting and measuring wake pressures for bodies in flight are well known. For example, see the Reports and Memorandums No. 1688 Brit. A.R.C., January 1963, and Use of a Pitot-static Probe for Determining Wing Section Drag In Flight at Mach Numbers From 0.5 to Approximately 1.0 NASA TMX-56025, July 1974, Lawrence C. Montoya, Merle A. Economu, and Ralph E. Cissell, obtainable through the NASA Flight Research Center, Edwards, Calif. 93523.

However, as can be fully appreciated by those familiar with techniques of this general nature, devices which provide absolute values for pressure measurements tend to lack the accuracy required in obtaining wing profile drag measurements for low values of dynamic and Reynolds Numbers. For example, improved accuracy is necessary if small airfoil performance differences, due to factors such as airfoil surface, ambient air turbulence or Reynolds Numbers are to be measured. The desired accuracy is necessary if aerodynamic efficiency is to be realized. Such efficiency has now become of primary concern by those attempting to reduce fuel consumption as well as designers attempting to select optimum airfoils for given missions.

It is, therefore, a general purpose of the instant invention to provide an improved pressure measuring system for use in conducting wake investigations for wings in flight, through a use of which data of enhanced accuracy and reliability is obtainable.

OBJECTS AND SUMMARY OF THE INVENTION

It is, therefore, an object of the instant invention to provide an improved system for obtaining accurate measurements of wake pressures for a wing in flight.

Another object is to provide a system having a capability of defining wake characteristics for low speed airfoil sections.

It is another object to provide an improved pressure measuring system for use in obtaining in-flight wing profile drag measurements for low values of dynamic pressure and Reynolds Number.

It is another object to provide a system having a single transducer for use with a pitot-traverse technique in obtaining data relating to wing profile drag measurements whereby differential pressure measurements are obtainable.

It is another object to provide an improved system for use in conducting wake investigations for a wing in flight characterized by a single transducer for providing differential pressure measurements in lieu of absolute pressure measurements, as heretofore relied upon in conducting wake investigations for wings in flight.

These and other objects and advantages are achieved through a use of an improved system comprising a first pressure head including a reference total pressure port adapted to be mounted on a wing and supported thereby in spaced relation with a wake generated by the wing in flight, a second pressure head including a reference static pressure port adapted to be mounted on the wing and supported thereby in spaced relation with the wake, and probe adapted to be displaced along an arc extending through the wake and having a third pressure head including a total pressure port as well as a fourth pressure head including a static pressure port, and a transducer commonly connected to said heads through a switching device adapted to connect pairs of the ports to the transducer in opposing relationships, whereby measurements of pressure differentials are obtainable with increased accuracy utilizing a transducer scaled to the pressure measurement range, as will hereinafter become more readily apparent by reference to the following description and claims in light of the accompanying drawings.

DESCRIPTION OF THE DRAWINGS

FIGS. 3a and 3b comprise perspective fragmented views of the switching device shown in FIG. 2, in alternate operative configurations.

DESCRIPTION OF THE PREFERRED EMBODIMENT

Figure 1:
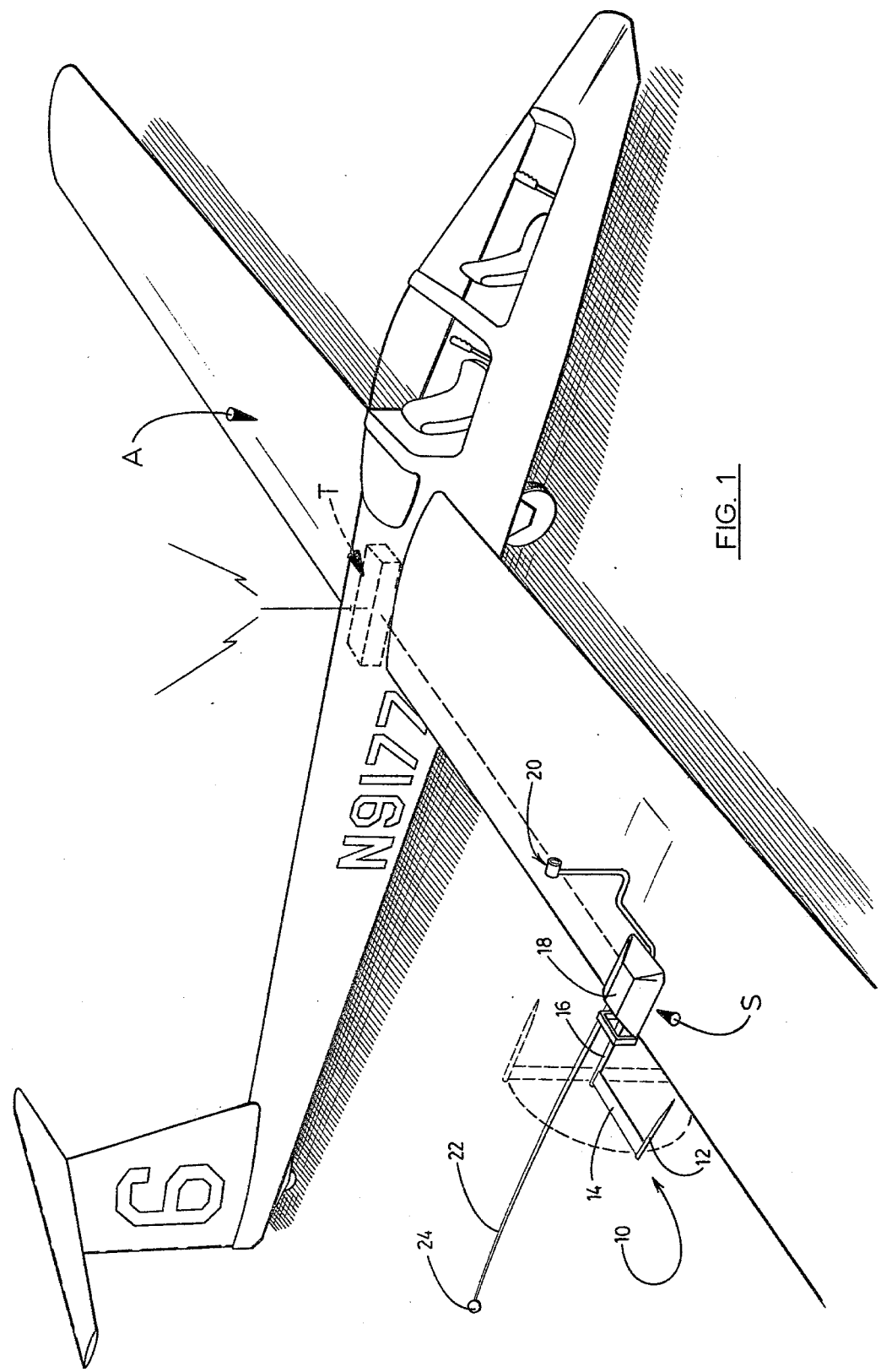
FIG. 1 is a perspective view depicting an operative environment for the system of the instant invention.
Figure 2:
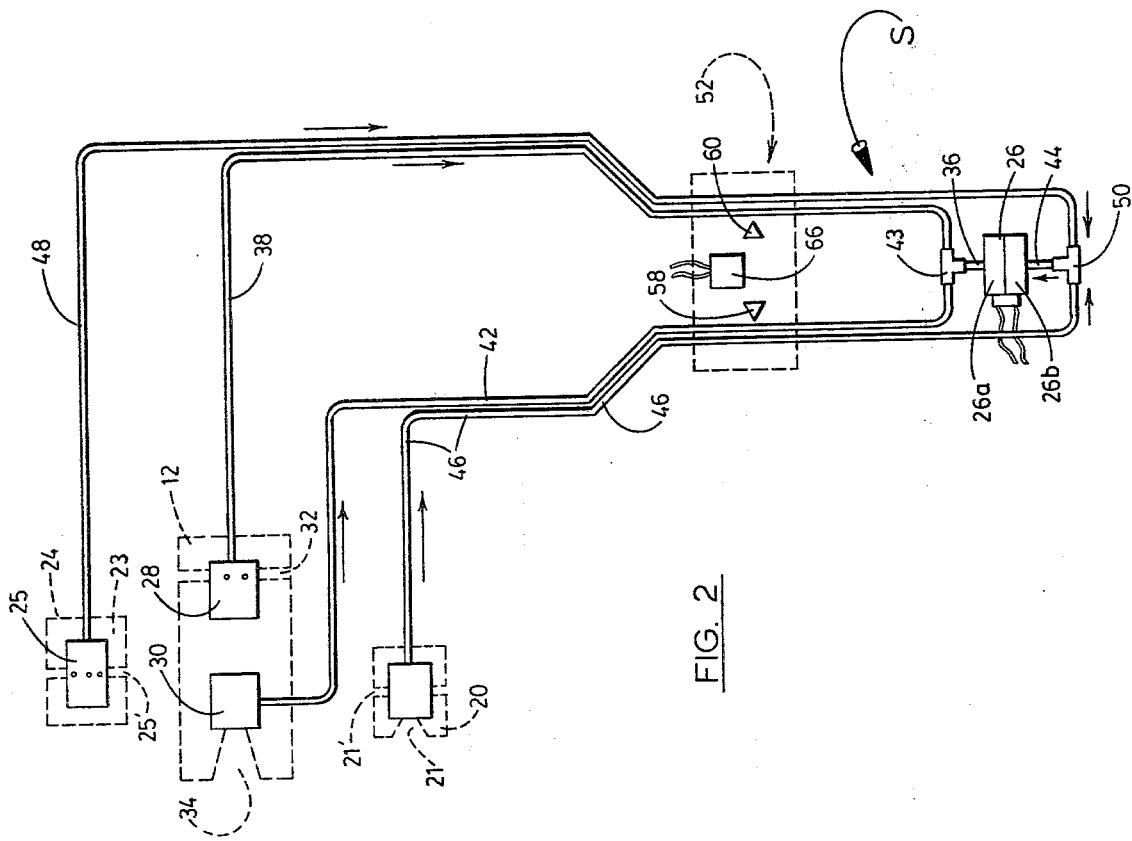
FIG. 2 is a schematic view of the system shown in FIG. 1 depicting a pneumatic circuit including a differential transducer, a plurality of pressure heads, and a pressure switching device interposed between the heads and the transducer for controlling application of pressure to the transducer.

Referring now to the drawings, with more particularity, wherein like reference characters designate like or corresponding parts throughout the several views, there is shown in FIG. 1 an airplane generally designated A, having mounted thereon an improved pressure measuring system, generally designated S, FIG. 2, which embodies the principles of the instant invention.

As shown in FIG. 1, the system S is mounted on one wing of a T-6 sail plane having a modified Workmen FX-61-163 airfoil. The modification of the wing consists of a straightened aft lower surface cusp region, not shown, and a 17% flap hinged on the lower surface. The wing surface finish, as shown, is smooth and is characterized by a maximum waviness for the test region near the midspan of about 0.008 centimeters in a 5.08 centimeter section of the surface. Data, hereinafter referred to, has been obtained for calibrated air speeds from about forty (40) knots to about one-hundred twenty five (125) knots which provided inflight test section chord Reynolds Numbers between $1 \times 10^6$ and $3 \times 10^6$, respectively. Therefore, it should be apparent that the system S is particularly suited for use in conducting wing wake investigations at speeds substantially lower than the speeds at which wing wake investigations heretofore have been conducted.

As shown, the system S includes a wake traversing probe, generally designated 10, of known design. The probe 10, briefly, is mounted on the trailing edge of a wing of the aircraft A and includes a probe head 12 supported by a mast arm 14 mounted on a rotatable shaft adapted to serve as a base 16 connected with a drive motor, not designated, housed by a fairing 18. Preferably, the probe, mast and base are fabricated from materials such as stainless steel while a mounting block, now shown, fabricated from aluminum or a similar material is employed as a support for the drive motor.

Since the details of the drive motor, its mounting, and the probe 10 form no part of the claimed invention, a detailed description thereof is omitted in the interest of brevity. However, it is to be understood that the probe is supported to be rotated through at least a 90° arc, and preferably through an arc of 180° extending from a position above the chord line of the wing, as indicated in dashed lines, in a position located beneath the wing, as also indicated in dashed lines. For the probe, as shown, the positions are approximately eight inches apart. Of course, where so desired, the probe 10 is adapted to be rotated through 360° of rotation. As a practical matter, the fairing 18 is fabricated from a suitable material such as fiberglass or the like. Again, the details of the probe form no specific part of the claimed invention, therefore a detailed description thereof is omitted in the interest of brevity. It is sufficient to understand that the head of the probe 12 is supported for arcuate displacement through the wake.

It is to be understood that the system S further includes a pressure head, generally designated 20, commonly referred to as a Kiel tube. The head 20 includes a housing 21 having defined therein a throat 21' comprising a port the purpose of which is to provide a reference total pressure input to the system S. Mounted on the wing in trailing relation with the probe there is a trailing boom 22. This boom 22 serves as a support for a static pressure head 23 including a housing 24. The housing 24 includes a chamber 25 having ports 25' defined therein, the purpose of which is to provide a reference static pressure input for the system. Preferably, the pressure heads 20 and 24 are mounted on the wing as near the probe 10 as practicable in order to avoid lag effects.

Turning now to FIG. 2, it can be seen that the system S includes a differential transducer 26 having opposite sides, which for the sake of convenience, are designated 26a and 26b. The pressure transducer 26 is of known design and comprises a low range differential transducer capable of measuring within a range of ±0.25 psi and is obtainable under the trade name Setra. It is to be understood that the transducer 26 also is suitably mounted, preferably beneath the fairing 18. Moreover, the transducer 26 is adapted to provide intelligence in the form of electrical signals indicative of pressure differentials established thereacross as pressures are applied to the opposite pressure inlet sides 26a and 26b thereof in a manner which will hereinafter become more readily apparent.

As also shown in FIG. 2, the probe head 12 includes a housing 28 having defined therein a ported static pressure chamber, the purpose of which is to provide a static pressure input for the pressure to which the probe head 12 is subjected. Similarly, the probe head 12 also includes a housing 30 having defined therein a total pressure chamber, the purpose of which is to provide a total pressure input, including both static pressures and dynamic pressure, to which the probe is subjected as a result of the effects of flight.

In practice, the static pressure chamber of the housing 28 communicates with ambient static pressure via suitable orifices 32 defined in the head 12, while the total pressure chamber of the housing 30 communicates with ambient total pressures via a suitable port defined by a throat 34. Consequently, pressures developed within the housings 28 and 30 are representative of static pressures and total pressures, respectively, to which the probe head 12 is, in operation, subjected.

The static pressure chamber of the housing 28, of the probe head 12, is connected to a pressure inlet conduit 36, FIG. 2, extended through the side 26a of the transducer 26. This connection is effected through a suitable length of tubing, designated 38. In a similar fashion, the total pressure chamber of the housing 30 for the probe head 12 is connected to the pressure inlet conduit 36 via a length of tubing designated 42. As shown, the lengths of tubing 38 and 42 are connected to the conduit 36 at a suitable befurcated fitting 43, such as a T-fitting designated 42. Hence, it should now be apparent that the chambers for the housings 28 and 30 of the probe head 12 are commonly connected to the pressure inlet side 26a of the transducer 26.

Connected to the pressure inlet side 26b of the transducer 26 is a pressure inlet conduit 44 to which is connected the chamber of the housing 21 of the pressure head 20, also via a length of flexible tubing, herein designated 46. The chamber 25 of the housing 24 also is connected to the conduit 44, via a length of flexible tubing 48. Preferably, a T-fitting, designated 50, also is provided for connecting the lengths of tubing 46 and 48 with the conduit 44.

At this juncture, it should be noted that the lengths of tubing 38, 42, 46 and 48 comprise lengths of flexible tubing formed from a material such as Tigon and the like. It is important for the lengths of tubing to be sufficiently resilient to withstand repeated collapse for achieving compressive constrictions, and yet possess sufficient memory to return to the original configuration thereof.

Figure 4:
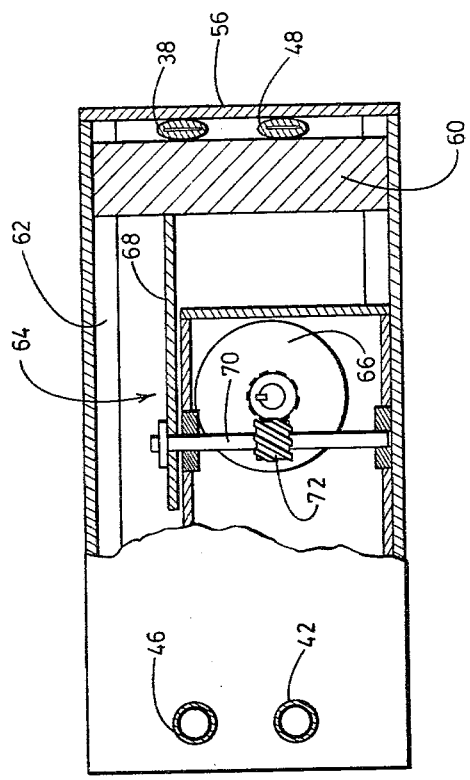
FIG. 4 is a fragmented, partially sectioned end view of the switching device.

In order to selectively achieve communication between the various pressure chambers of the aforementioned pressure heads and the transducer 26, a selectively operable pressure switching device 52 is provided. The pressure switching device 52, as shown, includes a suitable housing 54 of a box-like configuration through which the lengths of tubing are extended in paired relation, FIGS. 3a and 3b. The housing also is mounted beneath the fairing 18. The housing 54 includes a pair of rigid plates 56 extended along opposite side edges thereof and arranged in juxtaposed relation with the paired lengths of tubing. The plates 56 function as platens against which the lengths of tubing are forced and collapsed, FIG. 4, for closing the lengths of tubing.

Thus communication through the tubing is interrupted. Consequently, it should be appreciated that each of the plates 56 is contiguously related to one pair of the lengths of tubing extended through the switching device.

In order to collapse the paired lengths of tubing and thus effect a constriction thereof, there is mounted on the housing 54 a pair of laterally displaceable pressure feet 58 and 60 of a wedge-shaped configuration. As shown, the pressure feet 58 and 60 are of a substantially triangular cross sectional configuration and are supported for lateral displacement by a plurality of tracks 62 formed of track-like angle members extended transversely of the housing 54. It is to be understood that while the tracks 62 preferably are made up of angle members, the feet 58 and 60 are supported for lateral displacement in any manner desired.

Also disposed within the housing 54 is an actuator, generally designated 64 the purpose of which is to impart lateral displacement to the feet 58 and 60. The actuator 64 includes an electrically driven motor 66 connected to a rotatable camming arm 68 via a drive shaft 70, FIG. 4, and a worm and worm gear coupling including worm gear 72. The arm 68 includes an arcuate cam surface, not designated, for engaging the feet 58 and 60. The shaft 70 is driven in rotation in response to electrical energization of the motor 66 for purposes of imparting angular displacement to the camming arm 68 in order to cause the camming arm 68 to engage one or the other of the feet 58 and 60 as the arm is displaced. Moreover, the length of the camming arm 68 is such that the arm serves to laterally displace each of the feet 58 and 60, in response to an engagement therewith, a distance sufficient for forcing the wedge-shape face of the feet to engage the juxtaposed pair of lengths of tubing against the adjacently related platen 56 for purposes of constricting the tubing for thus effecting an interruption of pressure communicating with the transducer 26 through the switching device 52.

It should now be apparent that through a simple operation of the pressure switching device 52 the throat 34 of the total pressure chamber of the housing 30 and the ports 21' for the chamber of the housing 21 are connected to communication with the opposite sides of the transducer 26, while communication between the ports 25' for the chamber of the housing 25 and the ports 32 for the chamber of the housing 28 and the transducer 26 is interrupted. Similarly, a reverse configuration for the system S is achieved simply by energizing the motor 66 sufficiently for causing the cam arm 68 to engage the foot 58, while disengaging the foot 60. The inherent resiliency of the material from which the lengths of tubing are fabricated is sufficient for causing the tubing to return to its original open configuration and thus forceably displace the foot 60. Control of the operation of the motor 66 is achieved through a suitable circuitry, not shown.

Finally, while the measurements obtained employing the system S may be recorded in flight, as shown, a transmitter T is depicted as being connected with the system and employed for providing intelligence to a ground station in real time. Of course, whether the system S serves to drive a recorder or transmitter is a matter of convenience only. The signals derived from the transducer 26 are conducted to the transmitter T also through electrical circuitry, not designated. However, it is to be understood that the circuitry employed in controlling the transmitter T, or recording circuitry, is of a suitable design well within the purview of the art.

OPERATION

It is believed that in view of the foregoing description, the operation of the invention herein disclosed is apparent. However, in the interest of completeness the operation of the disclosed and claimed invention will, at this point, briefly be reviewed.

Figure 5:
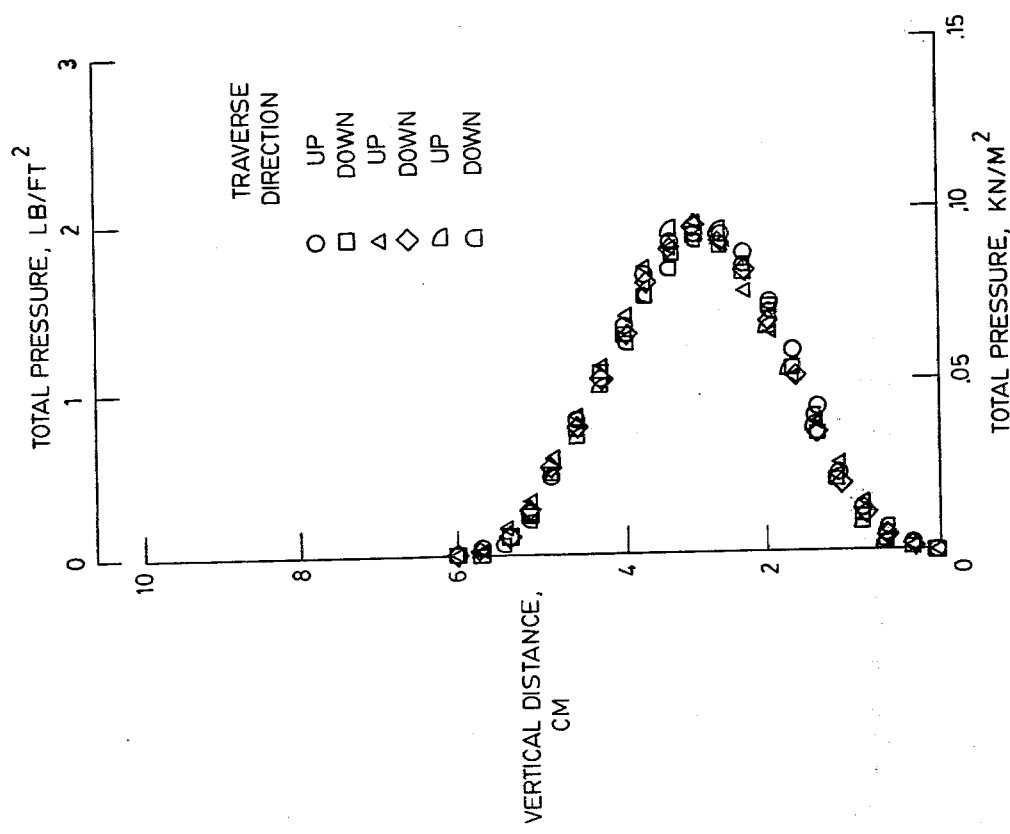
FIG. 5 is a graphic view depicting pressure measurements obtained employing the system of the instant invention, for a series of repetitive cycles.

An example of a wake profile obtained employing the system S of the instant invention is shown in FIG. 5. This profile was obtained at a caliberated velocity of forty-four (44) knots.

With the system assembled in the manner hereinbefore described, the system may be employed in an incremental total pressure mode ($\Delta p_t$), wherein the difference between the reference total pressure detected by the head 20 and the total wake pressure, sensed by the probe head 12, is measured. Thus the transducer 26 serves to sense pressure differential for the wake. Of course, when the probe head 12 is moved outside the wake, both sides of the transducer 26 are exposed to free-steam pressures, thereby providing in flight tare readings for the transducer 26. This feature tends to minimize the bias error for the transducer 26 and provides well defined wake edges.

In an incremental static pressure mode ($\Delta p$) the difference between the wake static pressure, and the reference static pressure is detected by the head 24 located on the trailing boom 22. The difference between wake static pressure and free stream static pressure may be obtained from a direct measurement and from the application of the position error correction. This position error correction for the trailing boom source preferably is obtained from the static pressure source of the airplane A.

In order to effect an operation of the system, in a total pressure mode, the motor 66 is selectively energized for causing the camming arm 68 to engage the pressure foot 60 for forcing the foot against the pair of lengths of tubing 38 and 48 for thus causing the tubing members to collapse against the plates 56. Of course, in response to a collapsing of these lengths of tubing pressure communication between the transducer 26 and the head 24 and the static pressure chamber of the probe head 12 is interrupted. Simultaneously, however, pressure communication between the total pressure chamber of the probe head 12 and the reference total chamber of the head 20.

Similarly, in order to operate the system in an incremental static pressure mode ($\Delta p$) wherein the difference between the wake static pressure and the reference static pressure are measured, the motor 66 is energized for causing the camming arm 68 to engage the foot 58 for laterally displacing the foot 58 into a collapsing relationship with the pair of tubing members 42 and 46. Thus communication between the total pressure chamber of the probe head 12 and the reference total chamber 21 of the head 20 and the transducer 26 is interrupted. Simultaneously, communication is established between the chambers of housings 25 and 28 and the transducer 26, as a consequence of the foot 60 being displaced in response to the expansion of the tubular members 38 and 48.

It will be appreciated that regardless of whether the system S is operated in an incremental total pressure mode or an incremental static pressure mode, pressures are applied to the opposite sides 26a and 26b of the transducer 26 for thus permitting differential pressure measurements to be obtained. These measurements tend to be much more accurate than measurements obtained employing absolute pressure as heretofore commonly practiced.

In view of the foregoing, it is believed to be apparent that the system embodying the principles of the instant invention provides a practical solution to many of the problems heretofore plaguing those engaged in conducting wake investigations employing traversing pitot and static robes.

What is claimed is:

1. In an improved system for use in conducting wake investigation for a wing in flight, the improvement comprising:
   A. a first pressure head including a reference total pressure port adapted to be mounted on a wing and supported thereby in spaced relation with a wake as the wake is generated by the wing;
   B. a second pressure head including a reference static pressure port adapted to be mounted on the wing and supported thereby in spaced relation with the wake;
   C. a probe head adapted to be supported for displacement through the wake including a total pressure port and a static pressure port; and
   D. pressure sensing means including a differential transducer and pressure switching means commonly connected to said heads and to said transducer for selectively connecting pairs of the ports the transducer in an opposed relationship, said switching means having included.
   first connecting means for connecting the reference total pressure port of the first pressure head in communication with one side of the transducer and means for simultaneously connecting the total pressure port of the head to the other side of the transducer, and
   second connecting means for connecting the reference static pressure port of the second pressure head in communication with said one side of the transducer, and means for simultaneously connecting the static pressure port of said probe head in communication with said other side of the transducer.

2. An improvement as defined in claim 1 wherein said first connecting means comprises a first pair of flexible, juxtaposed tubes extended from the reference total pressure ports of the first pressure head and the total pressure port of the probe head to said transducer and said second connecting means includes a second pair of flexible, juxtaposed tubes extended from the reference static pressure ports of the second pressure head and the static pressure port of the probe head to said transducer, and selectively operable switch means for alternatively collapsing the tubes of the first and second connecting means for thereof selectively interrupting communication established between the transducer and the pressure ports.

3. An improvement as defined in claim 2 wherein said selectively operable switch means includes:
   A. a pair of platens, each platen of the pair being disposed in juxtaposed relation with one side of a pair of the flexible tubes;
   B. a pair of pressure feet, each foot of the pair of feet being disposed in juxtaposed relation with a side of a pair of flexible tubes opposite said one side; and
   C. selectively operable actuator means for alternatively displacing the feet of said pair of feet into engaged relation with a pair of the tubes under a force sufficient for causing the tubes of the pair of engaged tubing to collapse.

4. An improvement as defined in claim 3 wherein said probe head is disposed in juxtaposition with the trailing edge of the wing and is supported for displacement along a path extended between a position located above the chord line of the wing to a position located beneath the chord line thereof.

5. An improvement as defined in claim 3 wherein each pressure foot is support for sliding displacement toward a pair of flexible tubes and is of wedge-shaped cross sectional configuration, and said means for displacing the feet includes a rotating cam supported for alternative engagement with the feet of said pair.

6. In combination with a system particularly suited for use in investigating wake characteristics for the wake of a wing in flight and characterized by a differential transducer for obtaining measurements of pressure differentials for pressures existing inside and outside the wake, the improvement comprising:
   a. First pressure sampling means remotely related to the wake for providing a reference static pressure;
   B. second pressure sampling means supported to be transported through the wake for providing a wake static pressure;
   C. third pressure sampling means remotely related to the wake for providing a reference total pressure;
   D. fourth pressure sampling means supported to be transported through the wake for providing a wake total pressure; and
   E. pressure switching means connected to said pressure sampling means and said transducer for simultanously applying static pressures obtained from the first and second pressure sampling means to opposite sides of the transducer and, alternatively, simultaneously applying total pressures obtained from the third and fourth pressure sampling means to opposite sides of the transducer, said switching means being characterized by a housing, a first pair of lengths of collapsible tubing extended through the housing for connecting the first and second pressure samping means to said transducer, a second pair of lengths of collapsible tubing extended through the housing for connecting the third and fourth pressure sampling means to said transducer, and selectively operable switch actuating means disposed within said housing for alternatively collapsing said first and second pairs of lengths of collapsible tubing.

7. An improvement as defined in claim 6 wherein said switch actuating means includes a pair of cam actuated pressure feet, each foot being supported for displacement along a rectilinear path extended toward a pair of said lengths of tubing and a selectively operable camming arm for displacing said feet.

* * * * *